United States Patent
Lecocq et al.

(10) Patent No.: US 11,559,783 B2
(45) Date of Patent: Jan. 24, 2023

(54) METHOD FOR PRODUCING AN ADSORBENT MATERIAL AND METHOD FOR EXTRACTING LITHIUM FROM SALINE SOLUTIONS USING THE MATERIAL

(71) Applicants: ERAMET, Paris (FR); IFP ENERGIES NOUVELLES, Rueil-Malmaison (FR)

(72) Inventors: Vincent Lecocq, Orlinéas (FR); Fabien André Pierre Burdet, Plaisir (FR); Yohan Florent Oudart, Versailles (FR); Guillaume Patrick André Maillet, Caluire-et-Cuire (FR)

(73) Assignees: ERAMET, Paris (FR); IFP ENERGIES NOUVELLES, Rueil-Malmaison (FR)

( * ) Notice: Subject to any disclaimer, the term of this patent is extended or adjusted under 35 U.S.C. 154(b) by 741 days.

(21) Appl. No.: 16/314,107

(22) PCT Filed: Jun. 30, 2017

(86) PCT No.: PCT/EP2017/066347
§ 371 (c)(1),
(2) Date: Dec. 28, 2018

(87) PCT Pub. No.: WO2018/002336
PCT Pub. Date: Jan. 4, 2018

(65) Prior Publication Data
US 2019/0314784 A1    Oct. 17, 2019

(30) Foreign Application Priority Data
Jun. 30, 2016  (FR) ...................... 16 56212

(51) Int. Cl.
B01J 20/08    (2006.01)
B01J 20/04    (2006.01)
(Continued)

(52) U.S. Cl.
CPC ............. B01J 20/08 (2013.01); B01J 20/041 (2013.01); B01J 20/305 (2013.01);
(Continued)

(58) Field of Classification Search
CPC ...... B01J 20/08; B01J 20/041; B01J 20/3007; B01J 20/3014; B01J 20/3042;
(Continued)

(56) References Cited

U.S. PATENT DOCUMENTS

| 4,348,297 A | 9/1982 | Bauman et al. |
| 5,599,516 A | 2/1997 | Bauman et al. |

(Continued)

FOREIGN PATENT DOCUMENTS

| CN | 1264112 | 2/2000 |
| EP | 103 034 | 3/1984 |

(Continued)

OTHER PUBLICATIONS

International Search Report dated Oct. 12, 2017 in International Application No. PCT/EP2017/066347.
(Continued)

*Primary Examiner* — James A Fiorito
(74) *Attorney, Agent, or Firm* — B. Aaron Schulman, Esq.; Stites & Harbison, PLLC (57) ABSTRACT

The present invention relates to the field of solid materials for the adsorption of lithium. In particular, the present invention relates to a new method for the preparation of a crystallized and shaped solid material, preferably in extruded form, of the formula $(LiCl)_x \cdot 2Al(OH)_3 \cdot nH_2O$, wherein n is between 0.01 and 10, x is between 0.4 and 1,
(Continued)

wherein it comprises a step a) of precipitation of boehmite under specific temperature and pH conditions, a step of bringing into contact the precipitate obtained with LiCl, at least one acid extrusion-kneading shaping step, wherein the method also comprises a final hydrothermal treatment step, all of which makes it possible to increase the lithium adsorption capacity, the adsorption kinetics, as well as the lithium/boron selectivity of the materials obtained with respect to the materials of the prior art, when it is used in a lithium extraction method of saline solutions.

10 Claims, 5 Drawing Sheets

(51) Int. Cl.
| | | |
|---|---|---|
| *B01J 20/30* | (2006.01) | |
| *C01D 15/00* | (2006.01) | |
| *C01F 7/141* | (2022.01) | |
| *C22B 26/12* | (2006.01) | |
| *C01F 7/34* | (2006.01) | |
| *C01F 7/78* | (2022.01) | |

(52) U.S. Cl.
CPC ....... *B01J 20/3007* (2013.01); *B01J 20/3014* (2013.01); *B01J 20/3042* (2013.01); *B01J 20/3078* (2013.01); *B01J 20/3085* (2013.01); *C01D 15/00* (2013.01); *C01F 7/141* (2013.01); *C01F 7/34* (2013.01); *C01F 7/78* (2022.01); *C22B 26/12* (2013.01); *C01P 2002/60* (2013.01); *C01P 2002/72* (2013.01); *C01P 2004/64* (2013.01)

(58) Field of Classification Search
CPC .. B01J 20/305; B01J 20/3078; B01J 20/3085; C01D 15/00; C01F 7/002; C01F 7/141; C01F 7/34; C22B 26/12
See application file for complete search history.

(56) References Cited

U.S. PATENT DOCUMENTS 6,174,511 B1 * 1/2001 Tsukada ............... B01J 35/1061
423/628
2010/0172811 A1 7/2010 Geniesse
2010/0189613 A1 7/2010 Geniesse
2011/0311419 A1 12/2011 Geniesse
2018/0353932 A1 * 12/2018 Boualleg .............. B01J 20/3078

FOREIGN PATENT DOCUMENTS

| FR | 3015458 A1 * | 6/2015 | .......... B01J 20/3085 |
| RU | 2 234 367 | 8/2004 | |
| WO | WO-94/19280 | 9/1994 | |
| WO | WO-20150/97205 | 7/2015 | |
| WO | WO-2015097205 A1 * | 7/2015 | .......... B01J 20/3078 |
| WO | WO-2016/193439 | 12/2016 | |

OTHER PUBLICATIONS

Written Opinion dated Oct. 12, 2017 in International Application No. PCT/EP2017/066347.
Vitaly Isupov, et al, "Synthesis, Structure, Properties and Application of Aluminium Hydroxide Intercalation Compounds", Chemistry for Sustainable Development, Aug. 4, 2000 (Aug. 4, 2000), pp. 121-127, XP055135012, Retrieved from the Internet: URL:http://www.sibran.ru/upload/iblock/4be/4be336e1a48b9e7197eb4fif8730b832.PDF [retrieved on Aug. 18, 2014] p. 121, right-hand column, p. 122, right-hand column, figure 2.
Guschina, E P, et al, "Recovery of lithium chloride from solns.— using basic lithium aluminium chloride sorbent in multistate countercurrent flow system", WPI/THOMSON, vol. 1994, No. 36, Sep. 1, 1994 (Sep. 1, 1994), XP002756839, the whole document.
ISUPOV, et al, "Aluminium hydroxide as selective sorbent of lithium salts from brines and technical solutions", Chemistry of Microporous Crystals: Proceedings of the International Symposium on Chemistry of Microporous Crystals, Tokyo, Jun. 26-29, 1009 In: Studies in Surface Science and Catalysis; ISSN 0167-2991; vol. 60; Adsorption and Its Appications in IND, vol. 120, No. Part A, Jan. 1, 1999 (Jan. 1, 1999), pp. 621-652, XP008163815, ISSN: 0167-2991, DOI: 10.1016/S0167-2991 (99)80567-9 [retrieved on Oct. 22, 2007] p. 640-p. 641 table 2, p. 646; figures 16, 17.
Euzen, et al, "Alumina" In: "Handbook of Porous solids", Apr. 25, 2008 (Apr. 25, 2008), Wiley-VCH Verlag GmbH, XP055057945, ISBN: 978-3-52-761828-6 p. 1591-1677, DOI: 10.1002/9783527618286.ch23b, p. 1602, paragraph 2-p. 160., paragraph 2, p. 1606-p. 1608.
Wu Z, et al, "Study on the morphology of alpha-A1203 precursor prepared by precipitation method", Journal of Alloys and Compounds, Elsevier Sequoia, Lausanne, CH, vol. 467, No. 1-2, Jan. 7, 2009 (Jan. 7, 2009), pp. 600-604, XP025716633, ISSN: 0925-8388, DOI: 10.1016/J.JALLCOM.2007.12.092 [retrieved on Feb. 20, 2008] 2.1. Sapmple preparation; p. 600, right-hand column.

* cited by examiner

METHOD FOR PRODUCING AN ADSORBENT MATERIAL AND METHOD FOR EXTRACTING LITHIUM FROM SALINE SOLUTIONS USING THE MATERIAL

TECHNICAL AREA

The present invention relates to the field of solid materials for the adsorption of lithium. In particular, the present invention relates to a new method for the preparation of a crystallized and shaped solid material, preferably in extruded form, of the formula $(LiCl)_x.2Al(OH)_3,nH_2O$, wherein n is between 0.01 and 10, x is between 0.4 and 1, wherein it comprises a step a) of precipitation of boehmite under specific temperature and pH conditions, a step of shaping by acid kneading in the presence of a specific acid, wherein the set of characteristics of the method make it possible to increase the adsorption capacity of lithium as well as the adsorption kinetics of the materials obtained compared with the materials of the prior art, when it is used in a method for extracting lithium from saline solutions and making it possible to use a smaller quantity of lithium chloride compared with the methods of the prior art, which makes it possible to improve the production cost of the solid and to reduce the amount of lithium lost in the effluents.

The present invention also relates to a method for extracting lithium from saline solutions using the crystalline solid material of formula $(LiCl)_x.2Al(OH)_3,nH_2O$, wherein n and x have the above definition, prepared according to the new preparation method according to the invention.

PRIOR ART

Lithium ions coexist with massive amounts of metals such as, for example, alkalis, alkaline earths, boron and sulphates, in particular in salt solutions such as brines. Thus, they must be extracted economically and selectively from these salt solutions. In fact, the chemical properties of lithium and alkali metals, preferably sodium (Na), and potassium (K) and alkaline earth metals, preferably magnesium (Mg), calcium (Ca) and strontium (Sr), make it difficult to separate these elements.

The solid materials of formula $(LiCl)_x.2Al(OH)_3,nH_2O$, wherein n and x have the above definition are known for their use in the phenomena of adsorption/desorption of lithium ions and, in particular, in the methods for extraction of lithium from saline solutions. These unstable structures allow the intercalation of lithium atoms in the structure and thus the extraction of lithium.

Several operating protocols leading to solids capable of selectively adsorbing lithium have been demonstrated in the prior art. In all cases, an aluminum trihydroxide $Al(OH)_3$, prepared or commercial, is brought into contact with a lithium precursor. Three main precursors are used: the most used is lithium chloride (LiCl). Aluminum hydroxide (LiOH) or lithium carbonate ($Li_2CO_3$) may also be used.

U.S. Pat. No. 6,280,693 describes a method for preparing an $LiCl/Al(OH)_3$ solid by adding an aqueous LiOH solution to a polycrystalline hydrated alumina to form $LiCl/Al(OH)_3$, and thus create lithium sites active in the crystalline layers of alumina without altering its structure. The conversion of $LiOH/Al(OH)_3$ to $LiCl/Al(OH)_3$ is then carried out by adding diluted hydrochloric acid. The alumina pellets thus prepared are then used in a method for extracting lithium from brine at high temperature. The lithium extraction method described in U.S. Pat. No. 6,280,693 uses the solid detailed above and comprises the following steps:

a) Saturation of a bed of solid by a brine containing a lithium salt LiX, wherein X is chosen from halides, nitrates, sulphates and bicarbonates, b) Displacement of the brine impregnated with a concentrated solution NaX, c) Elution of the LiX salt captured by the solid by passage of an unsaturated solution of LiX, d) Displacement of the impregnant with a concentrated solution of NaX, wherein the steps a) to d) are then repeated at least once.

The patent RU 2 234 367 describes a method for the preparation of a solid of formula $LiCl.2Al(OH)_3,nH_2O$ comprising a step of mixing aluminum trichloride ($AlCl_3$) and lithium carbonate ($Li_2CO_3$) in the presence of water at 40° C. The residue obtained is filtered and washed and then dried for 4 hours at 60° C. The solid thus obtained is not shaped.

The solid obtained is used for extracting the lithium contained in salt solutions by bringing it into contact with water in order to remove a portion of the lithium and then bringing it into contact with a saline solution containing lithium. The static capacity thus obtained is between 6.0 and 8.0 mg of lithium per g of solid.

The patent CN1243112 describes a method for preparing a solid of formula $LiCl.2Al(OH)_3,nH_2O$ comprising a step of precipitation of aluminum hydroxide microcrystals $Al(OH)_3$ by bringing $AlCl_3$ into contact with sodium hydroxide NaOH, then bringing the microcrystals into contact with a 6% solution of lithium chloride LiCl at 80° C. for 2 hours followed by filtration, rinsing and drying in order to obtain a powder $LiCl.2Al(OH)_3,nH_2O$ with an unordered and amorphous structure. A solution of a macromolecular polymer chosen from among fluorinated resins, polyvinyl chloride (PVC), chlorinated polyvinyl chloride (CPVC), ethylene perchlorate and cellulose acetate butyrate (CAB) acting as binder, is then mixed with the $LiCl.2Al(OH)_3,nH_2O$ powder to obtain a paste which is then shaped by granulation followed by drying in air.

The use of such a solid in a method for extracting lithium from salt lake brines makes it possible to obtain a low Mg/Li ratio and a mother liquor that is rich in lithium and which complies with the standards for the production of carbonates or chlorides of lithium.

An object of the present invention is to solve the technical problem of providing a solid material for the selective extraction of lithium from brine, wherein the solid material obtained is of good quality, without apparent defects and has good cohesion and good mechanical strength when it is brought into contact with a brine solution or water.

An object of the present invention is to solve the technical problem of providing a new method of preparing such a solid material.

Another object of the present invention is to solve the technical problem of providing a method for extracting lithium from saline solutions using the solid material.

Another object of the present invention is to solve the technical problem of providing a solid material for the implementation of a lithium extraction method for saline solutions, wherein the solid material makes it possible to limit the generation of fine particles, in particular because fine particles increase the pressure drop, favor the creation of preferential pathways and increase the rate of renewal of the material during the passage of the brine through a bed of a material within a column.

The applicants have discovered a new method for preparing a crystalline solid material of formula $(LiCl)_x.2Al(OH)_3,nH_2O$, wherein n is between 0.01 and 10, x is between 0.4 and 1, and wherein it comprises a combination of specific steps and, in particular, the fact of implementing both step a) of boehmite precipitation under specific temperature and pH conditions, and another step e) of shaping the resulting paste by kneading-extrusion in the presence of a specific acid, makes it possible to obtain a crystalline solid material of formula $(LiCl)_x.2Al(OH)_3,nH_2O$ with no apparent defect while offering both good cohesion and good mechanical strength of the material when it is brought into contact with a brine solution or water, and also offers lithium adsorption capacity as well as improved adsorption kinetics compared to the materials of the prior art when this is used in a prior art extraction of lithium from salt solutions.

Without being bound to any theory, the applicants have demonstrated that the implementation of step a) of precipitation under the operating conditions of temperatures and pH as defined according to the invention makes it possible to obtain a boehmite precipitate composed of small crystallites. In particular, the boehmite precipitate obtained has a size, obtained by the Scherrer formula in X-ray diffraction according to the crystallographic directions [020] and [120], that is respectively between 0.5 and 10 nm and between 0.5 and 15 nm, and preferably respectively between 0.5 to 2 nm and between 0.5 to 3 nm, and very preferably respectively between 0.5 and 1.5 nm and between 0.5 and 2.5 nm.

Scherrer's formula is a formula used in X-ray diffraction on powders or polycrystalline samples which connects the width at half the height of the diffraction peaks to the size of the crystallites. It is described in detail in reference: Appl. Cryst. (1978). 11, 102-113 *Scherrer after sixty years: A survey and some new results in the determination of crystallite size*, J. I. Langford and A. J. C. Wilson.

The method according to the invention comprising a precipitation step a) as claimed, thus makes it possible to obtain a solid final crystalline material of formula $(LiCl)_x.2Al(OH)_3,nH_2O$, wherein n is between 0, 01 and 10, x having the above definition, also poorly crystallized but having a lithium adsorption capacity and an adsorption kinetics that are improved compared with the materials of the prior art when it is used for a method of extraction of lithium from saline solutions.

SUMMARY AND INTEREST OF THE INVENTION

The expression "material of formula $(LiCl)_x.2Al(OH)_3, nH_2O$" is preferably understood to mean a material essentially comprising or consisting of a crystalline phase of formula $(LiCl)_x.2Al(OH)_3,nH_2O$, wherein n and x have the above definition.

The object of the present invention is a method for the preparation of a solid crystalline material of formula $(LiCl)_x.2Al(OH)_3,nH_2O$, wherein n is between 0.01 and 10, x is between 0.4 and 1, and wherein the method comprises at least the following steps:

a) a step of precipitating boehmite, in an aqueous medium, comprising bringing into contact at least one basic precursor preferably selected from among sodium aluminate, potassium aluminate, ammonia, hydroxide, sodium and potassium hydroxide; and at least one acidic precursor, aluminum chloride, and hydrochloric acid, wherein at least one of the basic or acidic precursors comprises aluminum, in order to obtain a boehmite suspension, wherein the step a) is carried out at a temperature of between 5 and 35° C., and the amount of the basic precursor is chosen in order to obtain a pH at the end of precipitation in the reaction medium of between 7.5 and 9.5, b) a step of bringing into contact the precipitate obtained in step a) with at least one lithium source, c) a filtration step of the suspension obtained in step b) to obtain a paste, d) a step of drying the paste obtained at the end of step c) at a temperature between 20 and 80° C., preferably for a duration between 5 minutes and 12 hours, e) a step of shaping the paste dried by kneading-extrusion, wherein the dried paste resulting from step d) is kneaded in the presence of an amount of acid of between 0.05 and 5% by weight relative to the dry material, wherein the dry material is the weight of the paste resulting from step d) dried in an autoclave at 200° C., preferably for 6 hours, wherein the acid is an organic or inorganic acid, and wherein the paste is then subjected to an extrusion step, f) a step of drying the shaped material obtained at the end of step e) at a temperature between 20 and 200° C., preferably for a period between 5 minutes and 20 hours.

One advantage of the invention is to provide a solid crystallized material that is shaped, preferably in extruded form, of formula $(LiCl)_x.2Al(OH)_3,nH_2O$, wherein n and x have the above definition, of good quality, with no apparent defect, and offering good cohesion and improved mechanical strength when it is brought into contact with a brine solution or a diluted solution, and preferably water.

Another advantage of the present invention is to provide a crystallized solid material shaped, preferably in extruded form, of formula $(LiCl)_x.2Al(OH)_3,nH_2O$, wherein n and x have the above definition, and offer lithium adsorption capacity as well as improved adsorption kinetics compared to the materials of the prior art, when it is used in a method for extracting lithium from saline solutions.

Another advantage of the present invention is to provide a shaped crystallized solid material, preferably in extruded form, of formula $(LiCl)_x.2Al(OH)_3,nH_2O$, wherein n and x have the above definition, and offer a lithium/boron selectivity, present in saline solutions, that is greater than materials prepared according to the prior art wherein they are prepared by kneading in the presence of a base.

Another advantage of a preferred embodiment of the present invention lies in the use of a smaller amount of lithium chloride compared with the methods of the prior art, which makes it possible to improve the production cost of the solid while reducing the amount of lithium lost in the effluents.

The invention also has the advantage of providing a method for preparing such a material.

The adsorption capacity of the aforementioned material is defined by the amount of lithium adsorbed for a given solution. It is calculated by those skilled in the art by integrating the amount of lithium fixed from a drilling curve also called leakage curve or saturation curve. The integration is carried out on the volume by the difference in lithium concentration between a solution after its loading on the aforementioned material and the theoretical concentration without loading. This amount of material may be related to the amount of material used to obtain a capacity in milligrams of lithium per gram of solid.

For boron, the adsorption capacity of the aforementioned material is calculated for a given solution in the same way as for lithium. It is calculated by those skilled in the art by integrating the amount of boron fixed from a drilling curve also called leakage curve or saturation curve. The integration is carried out on the volume by the difference in boron concentration between a solution after its loading on the aforementioned material and the theoretical concentration without loading. This amount of material may be related to the amount of material used to obtain a capacity of boron in milligrams per gram of solid. It is then compared to the lithium adsorption capacity by the Li/B ratio which is the weight ratio of the amount of lithium adsorbed by the amount of adsorbed boron.

The kinetics of adsorption of the aforementioned material is measured by those skilled in the art by studying the shape of a drilling curve also called leakage curve or saturation curve. This curve is obtained by means of a column filled with the adsorbent material to form a homogeneous bed, by percolating a saline solution containing lithium and by measuring the lithium concentration at the outlet of the adsorbent bed as a function of the volume of the solution used for a given flow.

By "adsorption capacity improved compared with the materials of the prior art" is meant an adsorption capacity greater than 6 mg Li/g of dry solid material.

By "dry solid material" is meant here a solid material dried at 200° C., preferably for 6 hours.

By "shaping" is meant that the material is solid and has sufficient cohesion when the solid is brought into contact with a brine solution so that it does not substantially lose its physical integrity, i.e. that it substantially retains its shape. More specifically, a solid formed in the sense of the invention covers a solid maintaining its cohesion in the lithium extraction conditions defined in the examples.

The cohesion as well as the mechanical strength of the shaped material, preferably by extrusion and prepared according to the invention, are tested during the production of drilling curves also called leakage curves or saturation curves. A solid exhibiting good mechanical strength does not produce fine particles and makes it possible to operate the column without there being any clogging. A solid having poor mechanical strength produces fine particles which induce clogging of the column.

The cohesion as well as the mechanical strength of the shaped material, preferably by extrusion and prepared according to the invention, are also tested by means of an accelerated aging protocol on a stirring table, either in brine or in water.

The stirring table is driven by a horizontal unidirectional movement with an amplitude of 4 cm at a speed of 190 movements per minute. The shaped solids are stirred for a total of 168 hours.

At the end of these 168 h, the shaped solid mixture/brine or water is sieved using a 315 μm grid mesh. Then the shaped solids remaining on the sieve are washed with the medium used during the stirring. The liquid fraction thus obtained, containing fine solid particles (diameter less than 315 μm) in suspension, is filtered using a Büchner equipped with a filter paper whose pores have a dimension of 0.45 μm. The cake formed by agglomeration of the fine particles is washed with deionized water. The solid residue thus obtained is dried in an autoclave at 50° C. until the mass stabilizes.

The ratio of the weight of solid residue to the weight of the initial shaped solids is then calculated, giving access to a percentage destruction of the shaped solids.

The percentage destruction of the materials prepared according to the invention makes it possible to assess the cohesion of the materials.

Good cohesion is obtained, in particular, for materials whose percentage destruction is less than 60%, and preferably less than 50%, when they are brought into contact with a solution of brine or any other diluted aqueous solution and, in particular, water.

The materials prepared according to the invention also offer improved mechanical strength compared to the materials of the prior art.

By "improved mechanical strength" is meant that the materials prepared according to the invention have a percentage destruction, when they are brought into contact with a solution of brine or any other diluted aqueous solution and in particular water, of less than 30% and preferably less than 20%.

Another advantage of the invention is the provision of a crystallized solid material shaped, preferably in the form of extrudates, of the formula $(LiCl)_x.2Al(OH)_3.nH_2O$, wherein n and x have the aforementioned definition and have no or few cracks that could cause swelling that would be harmful to the cohesion and mechanical strength of the material when it is brought into contact with a brine solution or a diluted solution, preferably water, and providing a method for preparing such a material.

The object of the present invention is also a method for extracting lithium from saline solutions using the shaped crystalline solid material of formula $(LiCl)_x.2Al(OH)_3.nH_2O$, wherein n is between 0.01 and 10, x is between 0.4 and 1, prepared according to the new preparation method according to the invention. The increase in the capacity of the material compared with the material of the prior art makes it possible to use less material to extract the same amount of lithium in a brine.

One advantage of the material and the extraction method according to the invention is to allow the selective extraction of lithium from a saline solution and thus obtain a high purification factor compared to the initial saline solution, calculated as being the X/Li ratio which is equal to the molar ratio of X/Li concentrations in the initial saline solution divided by the molar ratio of X/Li concentrations in the final solution, wherein X is selected from among sodium (Na), potassium (K), magnesium (Mg), calcium (Ca), boron (B), sulfur (S) and strontium (Sr). The object of the present invention is also a solid crystalline material of formula $(LiCl)_x.2Al(OH)_3.nH_2O$, wherein n is between 0.01 and 10, x is between 0.4 and 1, preferably in the form of extrudates that are obtainable by a method according to the invention.

The present invention also relates to a lithium extraction device of saline solution(s). The device according to the invention thus implements the extraction method according to the invention.

DESCRIPTION OF THE INVENTION

According to the invention, the method advantageously comprises a step a) of precipitating boehmite in an aqueous reaction medium, wherein the step comprises bringing into contact at least one basic precursor preferably selected from among sodium aluminate, potassium aluminate, ammonia, sodium hydroxide and potassium hydroxide; and at least one acidic precursor, aluminum trichloride ($AlCl_3$), and hydrochloric acid, wherein at least one of the basic or acidic precursors comprises aluminum, in order to obtain a boehmite suspension, wherein step a) is carried out at a temperature of between 5 and 35° C., and the amount of the basic precursor is chosen in order to obtain a pH at the end of precipitation in the reaction medium between 7.5 and 9.5.

The mixture in the aqueous reaction medium of at least one basic precursor and at least one acidic precursor requires either that at least the basic precursor or the acidic precursor comprises aluminum, or that the two basic and acidic precursors comprise aluminum.

Preferably, the basic precursor is sodium hydroxide (NaOH).

Preferably, the basic and acidic precursor(s) is/are added in the first precipitation step a) in aqueous solution.

Preferably, the aqueous reaction medium is water.

Preferably, step a) is carried out with stirring.

Preferably, the boehmite precipitation step a) is carried out at a temperature between 5 and 30° C., preferably between 10 and 30° C., and very preferably between 10 and 25° C., while the amount of the basic precursor is chosen in order to obtain a pH of the end of precipitation in the reaction medium of between 7.5 and 9, preferably between 7.7 and 8.8.

Preferably, the precipitation step a) is carried out for a period of between 10 minutes and 5 hours, preferably between 15 minutes and 2 hours.

The step a) of precipitation makes it possible to obtain a suspension of precipitated boehmite or aluminum oxyhydroxide (AlOOH).

The implementation of precipitation step a) under the operating conditions of temperatures and pH as defined above allows a boehmite precipitate having small crystallites to be obtained. The term "small crystallites" means a boehmite precipitate composed of crystallites whose size, obtained by the Scherrer formula in X-ray diffraction in the crystallographic directions [020] and [120], is respectively between 0.5 and 10 nm and between 0.5 and 15 nm, and preferably respectively between 0.5 to 2 nm and between 0.5 to 3 nm, and very preferably respectively between 0.5 and 1.5 nm and between 0.5 and 2.5 nm.

Preferably, the method comprises a step of washing and filtering the boehmite precipitate obtained at the end of step a).

Preferably the washing step is a washing step with water.

According to the invention, the method comprises a step b) of bringing the precipitate obtained in step a) into contact with at least one lithium source.

Preferably, the bringing into contact is carried out with a quantity of lithium chloride equivalent to a Li/Al molar ratio of between 0.3 and 4, preferably between 0.3 and 2, more preferably between 0.3 and 1.2, and very preferably between 0.4 and 1, preferably for a period of between 10 minutes and 12 hours.

Preferably, the boehmite precipitate obtained in step a), optionally filtered and washed, and the lithium chloride, are mixed in the presence of water to obtain a suspension in step b). Preferably, the mixing step b) is carried out with vigorous stirring.

Preferably, the bringing into contact step b) is carried out at a temperature of between 20 and 95° C., preferably between 50 and 95° C., and more preferably between 70 and 95° C.

Preferably, the bringing into contact step b) is carried out for a period of between 15 minutes and 12 hours, preferably between 15 minutes and 5 hours.

According to the invention, the suspension obtained at the end of step b) undergoes a step c) of filtration in order to obtain a paste.

Preferably, the filtered suspension is then washed, preferably with LiCl solution, or with water.

According to the invention, the paste obtained at the end of step c) is dried in a drying step d) preferably at a temperature of between 20 and 80° C., preferably for a period of time between 5 minutes and 12 hours.

Preferably, the drying step is carried out, in an autoclave or oven, at a temperature between 20 and 60° C., very preferably between 30 and 50° C., preferably for a period of time between 5 minutes and 10 hours.

The operating conditions of the drying step d) make it possible to obtain a dried paste with a loss on ignition (LOI) of between 30 and 75% and preferably between 35 and 60%. The loss on ignition so obtained allows the shaping, preferably by extrusion, of the dried paste under good conditions, and the obtaining of shaped materials, preferably in the form of extrudates that are resistant and without apparent defects, i.e. without crack.

In order to determine the LOI before the shaping step, a portion of the paste obtained is removed and placed in an autoclave for 6 hours at 200° C. The LOI is obtained from the difference between the weight of the sample before and after passage in the autoclave.

According to the invention, the dried paste obtained at the end of the drying step d) undergoes a step e) of shaping by acid extrusion kneading, wherein the dried paste resulting from step d) is kneaded in the presence of an amount of acid of between 0.05 and 5% by weight relative to the dry matter, wherein the dry matter is the weight of the paste resulting from step d), dried in an autoclave at 200° C., preferably for 6 hours, wherein the acid is an organic or inorganic acid.

Preferably, the organic acid is chosen from carboxylic acids and their derivatives and, preferably, from formic acid, acetic acid, oxalic acid, malonic acid, succinic acid and glutaric acid, adipic acid, alone or any of their mixtures as well as any of their derivatives.

By "carboxylic acid derivatives" are meant the carboxylic acid salts and preferably the alkaline earth salts, the alkali metal salts and the ammonium salts, or the acid anhydrides.

Preferably, the inorganic acid is selected from nitric acid, phosphoric acid, sulfuric acid and hydrochloric acid alone or any of their mixtures. Very preferably, the acid is an organic acid selected from oxalic acid, malonic acid, succinic acid, glutaric acid, adipic acid, alone or any of their mixtures, and, more preferably, the acid is oxalic acid.

The acid may advantageously be added in the shaping step e) in solution in water or in pure form, liquid or solid.

The amount of acid added in step e) is preferably between 0.1 and 2.5% by weight relative to the dry matter, wherein the dry matter is the weight of the paste resulting from step d) dried in an autoclave at 200° C., preferably for 6 hours. Preferably, no base is added in the extrusion kneading step e).

Preferably, the shaping step e) is not carried out in the presence of at least one solid precursor of alumina, preferably chosen from among aluminum oxides, aluminum hydroxides and aluminum oxyhydroxides, soluble or dispersible, in a solution of phosphoric acid, preferably from aluminum hydroxides and aluminum oxyhydroxides and preferably from among boehmite or pseudo-boehmite.

According to the invention, the paste is then subjected to an extrusion step in order to obtain extrudates.

The term "extrusion-kneading step" is understood to mean a step in which the dried paste obtained at the end of the drying step e) undergoes a first kneading step, according to the invention, in the presence of a base, and then the paste is subjected to an extrusion step, for example by passing through a die, and using, for example, a piston or a continuous twin-screw or single-screw extruder. The diameter of the die of the extruder is advantageously variable between 0.3 and 5 mm, preferably between 0.3 and 3 mm, and more preferably between 0.3 and 2 mm. The shape of the die, and therefore the shape of the material obtained in extruded form, is advantageously cylindrical, trilobal, quadrilobed or multilobed.

The step e) of extrusion-kneading shaping step is advantageously carried out in a manner known to those skilled in the art.

The step e) of extrusion-kneading shaping, and, in particular, the kneading step, may optionally be carried out in the absence of a binder, or in the presence of a binder with the exception of a binder chosen from among the solid precursors of alumina described above.

Preferably, the dried paste obtained at the end of the drying step d), and optionally at least one binder, as well as the acid in the event that these are present, are mixed, preferably in one go, in a kneader. The kneader is advantageously chosen from batch kneaders, preferably with a cam or Z-arm, or with the aid of a twin-screw kneader-mixer. The mixing conditions are adjusted in a manner known to those skilled in the art, and aim to obtain a homogeneous and extrudable paste.

In extrusion-kneading methods known to those skilled in the art, the extrudability of the paste may advantageously be adjusted through the addition of water in order to obtain a paste that is suitable for carrying out step e) of shaping through extrusion.

After the extrusion-kneading step, the extrudates obtained may advantageously undergo a spheronization step in the event that material in the form of beads is used.

According to the invention, the shaped material and preferably the extrudates obtained at the end of step e) undergo a drying step f) at a temperature between 20 and 200° C., preferably for a period of between 5 minutes and 20 hours, in order to obtain the crystalline solid material of formula $(LiCl)_x.2Al(OH)_3.nH_2O$ that is preferably shaped in the form of extrudates or beads.

Preferably, the drying step f) is carried out at a temperature between 20 and 100° C., preferably between 20 and 80° C., and very preferably between 20 and 60° C., preferably for a period of time between 5 minutes and 18 hours, preferably between 5 minutes and 14 hours.

The specific conditions of the drying step f) make it possible to obtain a solid crystallized material having the desired $(LiCl)_x.2Al(OH)_3.nH_2O$ phase.

The drying step f) is advantageously carried out according to the techniques known to those skilled in the art and preferably in an oven or autoclave.

Preferably, the dried shaped material and preferably the extrudates obtained at the end of step f) may optionally be subjected to a hydrothermal treatment step g) at a temperature between 50 and 200° C., and preferably for a period between 30 min and 12 hours.

Preferably, step g) is carried out at a temperature between 70 and 200° C., preferably between 70 and 180° C., and very preferably between 80 and 150° C., for example for a period of time between 30 minutes and 120 hours.

The hydrothermal treatment step g) is advantageously carried out according to a technique known to those skilled in the art.

According to a preferred embodiment, step g) is carried out in an autoclave, under autogenous pressure and under a saturated water atmosphere. Preferably, step g) is carried out by introducing a liquid at the bottom of the autoclave, wherein the liquid is chosen from water, alone or any of its mixtures with at least one acid, a base or a lithium salt. Preferably, the shaped and dried material, and preferably the extrudates obtained at the end of step g), are not in contact with the liquid at the bottom of the autoclave.

In the case where water is introduced into the autoclave in a mixture with an acid, the acid is advantageously chosen from among nitric acid, hydrochloric acid, sulfuric acid and a carboxylic acid.

In the case where water is introduced into the autoclave in admixture with a base, the base is preferably selected from lithium hydroxide, sodium hydroxide, potassium hydroxide and ammonia.

In the case where water is introduced into the autoclave mixed with a lithium salt, the lithium salt is advantageously chosen from lithium chloride and lithium carbonate.

Preferably, step g) is carried out in the presence of a humid atmosphere comprising a water content of between 5 and 50% by weight, preferably between 5 and 45% by weight, and more preferably between 5 and 40% by weight.

According to one embodiment, step g) may be carried out in a drying oven in the presence of a moist air stream containing between 5 and 50% by weight, preferably between 5 and 45% by weight, and more preferably between 4 and 40% by weight of water, or in an autoclave operating under a moist air flow containing between 5 and 50% by weight, preferably between 5 and 45% by weight, more preferably between 5 and 40% by weight of water, according to methods known to those skilled in the art.

Step g) of hydrothermal treatment in a controlled atmosphere makes it possible to obtain a solid crystallized material of formula $(LiCl)_x.2Al(OH)_3.nH_2O$, wherein n is between 0.01 and 10, x is between 0.4 and 1, preferably shaped in the form of extrudates, offering good strength and good mechanical strength when it is brought into contact with a brine or a diluted solution and preferably water.

At the end of the step g), the material obtained and preferably shaped in the form of extrudates, is then advantageously recovered and may optionally be washed.

The shaped material and preferably the extrudates obtained at the end of step g) may then be optionally subjected to a drying step h), wherein the drying step preferably operates at a temperature between 15 and 50° C., preferably for a period of between 5 minutes and 12 hours in order to obtain the crystalline solid material of formula $(LiCl)_x.2Al(OH)_3.nH_2O$, wherein n is between 0.01 and 10, x is between 0.4 and 1, shaped.

The drying step h) is advantageously carried out according to the techniques known to those skilled in the art, and preferably in an oven or autoclave.

The method according to the present invention thus makes it possible to obtain a solid crystalline material of formula $(LiCl)_x.2Al(OH)_3.nH_2O$, wherein n is between 0.01 and 10, x is between 0.4 and 1, preferably in the form of section extrudates (larger cross-section dimension) or a diameter between 0.2 and 5 mm, preferably between 0.3 and 4 mm, more preferably between 0.3 and 3 mm, very preferably between 0.3 and 2 mm, and particularly preferably between 0.3 and 1.8 mm.

The best results in terms of mechanical strength and cohesion of the solid crystallized material obtained according to the preparation method according to the invention are obtained in the case of extrudates or section beads (larger dimension of the cross-section), or a diameter comprised between 0.2 and 5 mm, preferably between 0.3 and 1.8 mm, wherein the extrudates are obtained through the combination of a specific shaping step as described above and a final drying step h) at a temperature of between 15 and 50° C., in particular at 40° C., preferably for a period between 5 minutes and 12 hours.

The solid crystalline material of formula $(LiCl)_x.2Al(OH)_3,nH_2O$, shaped, preferably in the form of extrudates or beads, and prepared according to the sequence of steps a) to h) of the preparation method according to the invention, may be characterized according to the following techniques: the adsorption of nitrogen for the determination of the specific surface according to the BET method; X-ray diffractometry in the diffraction angle range $2\theta=0.8$ to $40°±0.02°$ in reflection geometry to identify the structure of the material and the elemental analysis.

The X-ray diffraction pattern of the material in the form of extrudate corresponds to a crystalline solid of formula $(LiCl)_x.2Al(OH)_3,nH_2O$, wherein x=1 according to JCPDS sheet No. 0031-07-00, and wherein n is between 0.01 and 10, preferably between 0.1 and 0.5, preferably between 0.1 and 5, and very preferably between 0.1 and 1, obtained according to the invention, shaped, advantageously in the form of extrudates.

The preparation method according to the present invention thus makes it possible to obtain a solid crystallized material of formula $(LiCl)_x.2Al(OH)_3,nH_2O$, wherein n and x have the above definition, preferably shaped in the form of extrudates, offering good cohesion, with no apparent defect and offering good strength and good mechanical strength when it is brought into contact with a brine or a diluted solution and preferably water.

The good properties of the material obtained result from the combined effect of shaping, preferably by extrusion of a paste, in the absence of a binder, directly, after a drying step operating under specific conditions, of the implementation, a drying step following the shaping, also operating under specific conditions and possibly the implementation of a final hydrothermal treatment step operating preferably in an autoclave.

Furthermore, the shaped solid crystallized material, preferably in the form of extrudates, thus obtained of formula $(LiCl)_x.2Al(OH)_3,nH_2O$, wherein n and x have the above definition, has improved lithium adsorption capacity as well as adsorption kinetics compared with prior art materials when it is used in a lithium extraction method of saline solutions.

The materials obtained according to the invention have an improved adsorption capacity compared to the materials of the prior art greater than 6 mg Li/g of dry solid material, i.e. solid material dried at 200° C., preferably between 6 and 10 mg Li/g, preferably between 6 and 8 mg Li/g of dry solid material.

The object of the present invention is also a method for extracting lithium from a saline solution using the solid crystallized material of formula $(LiCl)_x.2Al(OH)_3,nH_2O$, wherein n is between 0.01 and 10, x is between 0.4 and 1, prepared according to the invention.

The saline solution used in the extraction method according to the invention advantageously comprises a lithium concentration of between 0.001 mol/L and 0.5 mol/L, preferably between 0.02 mol/L and 0.3 mol/L.

The saline solution also contains other species, such as, for example, the species chosen from among the following list: Na, K, Rb, Cs, Mg, Ca, Sr, Ba, F, Cl, Br, I, $SO_4$, $CO_3$, $NO_3$, and $HCO_3$. The saline solution may advantageously be saturated with salts or not.

The saline solution may be any natural saline solution, concentrated or resulting from a lithium extraction or transformation method. For example, the saline solution used in the extraction method according to the invention may be advantageously chosen among brine from salt lakes or from geothermal sources, brines subjected to evaporation to obtain brines concentrated in lithium, seawater, effluents from cathode production plants, or lithium chloride or hydroxide production and effluents of the method for extraction of lithium from minerals.

The lithium extraction method according to the invention is preferably a method for the selective extraction of lithium. In fact, it allows the separation of lithium from alkali metals, preferably sodium (Na), and potassium (K) and alkaline earth metals, preferably magnesium (Mg), calcium (Ca) and strontium (Sr), that are present in a massive amount in the saline solutions treated in the extraction method.

The lithium extraction method according to the invention also allows the selective separation of lithium from other compounds such as boron and sulphates.

The lithium extraction method according to the invention is advantageously carried out in a unit comprising at least one column, wherein the columns comprise at least one bed of the solid crystallized material of formula $(LiCl)_x.2Al(OH)_3,nH_2O$, wherein n, and x have the above definition, shaped and prepared according to the preparation method according to the invention.

Preferably, the lithium extraction method according to the invention is implemented in a unit comprising at least two columns, and preferably two and three columns, comprising at least one bed of solid crystallized material of formula $(LiCl)_x.2Al(OH)_3,nH_2O$, wherein n, and x have the above definition.

The lithium extraction method advantageously comprises at least the following steps:
- a step of activating the solid crystallized material of formula $(LiCl)_x.2Al(OH)_3,nH_2O$, wherein n and x have the above definition,
- a step of loading the adsorption-activated material by passing the saline solution on the activated material,
- optionally at least one step of washing the saline solution by impregnating the material by passing a washing solution on the material,
- a lithium desorption step carried out by passing water or an aqueous solution of lithium salt on the material in order to obtain an eluate comprising at least lithium.

Preferably, the lithium extraction method according to the invention comprises a prior step of putting the material in a column.

Preferably, the extraction method comprises an optional step of washing the saline solution by impregnating the material by passing a washing solution on the material, wherein the washing step is preferably carried out between the loading step and the desorption step.

Preferably, the step of activating the solid crystallized material of formula $(LiCl)_x.2Al(OH)_3,nH_2O$, wherein n and x have the above definition, preferably shaped, and preferably in the form of extrudates or beads, is effected only once during the putting of the synthesized material in the column, and shaped according to the preparation method according to the invention.

The activation step makes it possible to activate the sites intended to selectively adsorb lithium.

Preferably, the activation step is advantageously carried out by the passage of an activation solution chosen from water and a lithium salt solution having a concentration of between 0.001 mol/L and 0.1 mol/L, preferably between 0.001 mol/L and 0.05 mol/L, and more preferably between 0.01 and 0.04 mol/L.

Preferably, the lithium salt used in solution in the activation step is chosen from among lithium chloride (LiCl), lithium nitrate and lithium bromide.

Very preferably, the lithium salt used in solution in the activation step is lithium chloride (LiCl).

The activation step is advantageously carried out at a temperature of between 0° C. and 90° C., and preferably between 10° C. and 60° C., and more preferably between 10° C. and 30° C. with a residence time of the activation solution in the column preferably between 0.03 and 10 h, and more preferably between 0.06 and 1 h.

The amount of solution required for activation is advantageously between 1 and 30 column volumes, preferably between 2 and 20 column volumes.

The bed volume is also called the volume occupied by the bed of the solid in the column or BV according to the terminology specific to the technical field known to those skilled in the art.

Prior to the activation step, the solid crystallized material may optionally undergo a washing step with a washing solution and preferably a solution of lithium chloride (LiCl) or a mixture of lithium chloride (LiCl) and sodium chloride (NaCl).

The step of loading the activated material by adsorption is advantageously carried out by passing the treated saline solution on the activated material in the extraction method according to the invention.

The loading step is advantageously carried out at a temperature between 0° C. and 90° C., and preferably between 10° C. and 70° C., with a residence time of the solution, preferably of the treated salt solution, in the column preferably between 0.03 and 10 h, and more preferably between 0.06 and 1 h 30 minutes.

The amount of solution necessary to saturate the material depends on the adsorption capacity of the material and the lithium concentration of the saline solution.

The adsorption capacity of the materials according to the invention is greater than 6 mg Li/g of dry solid material, and preferably between 6 and 8 mg Li/g of dry solid material.

In the case where the lithium extraction method according to the invention is implemented in a unit comprising two columns, the first column is advantageously saturated with lithium during the loading step. The second column, receiving the output stream of the first column, is advantageously loaded until a lithium leak not exceeding 10% of the lithium concentration of the inlet stream, and preferably 5%, thus makes it possible to maximize the recovery efficiency of lithium.

In the case where the lithium extraction method according to the invention is carried out in a unit comprising three columns, the third column, already saturated with lithium, is dedicated to the steps of washing and then of desorption of lithium as described below, while loading the other two columns.

The first fraction of the output stream of the adsorption loading step, advantageously between 0 and 1 column volumes, corresponds to the removal of the impregnant resulting from the activation step of the solid material. This fraction may be considered as an effluent or recycled, and preferably recycled as an input stream of the desorption step. In the case of the treatment of natural brine or seawater beyond 1 column volume, the entire output stream of the adsorption loading step, hereinafter referred to as raffinate, which does not undergo any chemical treatment, is advantageously and preferably returned to the original salt solution deposit.

At the end of the loading step by passing the saline solution treated in the method according to the invention on the activated material, the saline solution impregnates the activated material.

The saline solution impregnating the activated material is optionally washed in at least one washing step by passing a washing solution on the material.

The step(s) of washing the saline solution impregnating the material, is/are advantageously carried out by upwards or downwards passage of a washing solution on the material, and preferably downwards.

Preferably, the washing solution is selected from among water and an aqueous solution of sodium salt and preferably sodium chloride (NaCl), optionally comprising a lithium salt and preferably lithium chloride (LiCl), wherein the solution advantageously has a concentration of sodium salt and preferably sodium chloride (NaCl), greater than 0.5 mol/L, preferably between 1 mol/L and saturation, and a concentration of lithium salt and preferably lithium chloride (LiCl), between 0 mol/L and 2 mol/L.

The washing step is advantageously carried out at a temperature between 0° C. and 90° C., and preferably between 10° C. and 70° C., and with a residence time of the solution, preferably of the washing solution, in the column between 0.03 and 10 h, preferably between 0.06 and 1 h. The amount of solution required for washing is between 0.1 and 10 column volumes, and preferably between 0.5 to 5 column volumes.

The output stream from the washing step is considered as an effluent, or is advantageously recycled, and preferably recycled at the inlet of the loading step or directly at the inlet of the second column in the case where the method of extraction of lithium according to the invention is implemented in a unit comprising at least two columns.

The washing step allows the washing of the saline solution impregnated in the material during the step of loading the material by adsorption, while limiting the desorption of lithium.

In the case where the washing solution is a concentrated aqueous solution of sodium chloride (NaCl), the washing step not only makes it possible to eliminate the saline solution impregnated in the material during the step of loading the material by adsorption, but also to desorb elements such as boron, sulphates, alkalis other than lithium and sodium, and alkaline earths.

The lithium desorption step is then carried out by passing water or an aqueous solution of lithium chloride (LiCl) on the material at the end of the washing step in order to obtain an eluate comprising at least lithium.

Preferably, the desorption step is carried out by the ascending or descending, and preferably descending, passage of a desorption solution chosen from water and a solution of lithium chloride (LiCl) containing from 0.001 mol/L to 2 mol/L LiCl, and preferably 0.01 mol/L to 1 mol/L.

The desorption step is advantageously carried out at a temperature of between 0° C. and 90° C., and preferably between 10° C. and 70° C., with a residence time of the desorption solution in the column, preferably between 0.03 and 10 h, and preferably between 0.06 and 1 h.

The amount of lithium chloride solution (LiCl) required for the desorption is advantageously between 0.01 and 10 column volumes, and preferably between 0.05 and 5 column volumes.

The output stream from the lithium desorption step generates the final product of the method, called the eluate.

Between 0 and 4 column volumes, and preferably between 0.2 and 3 column volumes of the eluate, is advantageously recovered.

All the other fractions of the output stream of this step not constituting the final product called the eluate, is considered as an effluent or is advantageously recycled, and preferably recycled at the inlet of the loading, washing or elution step.

The eluate obtained at the end of the extraction method according to the invention is a solution containing mainly Li, Na and Cl elements as well as impurities preferably chosen from among K, Mg, Ca, Sr, B or $SO_4$.

The eluate is then advantageously concentrated and purified to obtain a high purity lithium salt.

The lithium extraction method according to the invention allows the selective extraction of lithium from a saline solution and thus makes it possible to obtain a high purification factor compared to the initial saline solution, calculated as the ratio X/Li which is equal to the molar ratio of concentration X/Li in the initial saline solution divided by the molar ratio of concentration X/Li in the eluate, wherein X is chosen from among sodium (Na), potassium (K), magnesium (Mg), calcium (Ca), boron (B), sulfur (S) and strontium (Sr).

The present invention also covers a lithium extraction device characterized in that it comprises a unit comprising at least one column, wherein the column comprises at least one lining comprising the solid crystallized material of formula $(LiCl)_x.2Al(OH)_3,nH_2O$, wherein n and x have the above definition.

More particularly, the invention covers a device implementing the lithium extraction method according to the invention. Even more specifically, the device of the present invention comprises units or means implementing the different steps of the lithium extraction method according to the invention.

The term "according to the invention" or any equivalent term is intended to cover any embodiment, variant, advantageous or preferred characteristic, taken alone or in any combination thereof, without any limitation.

The invention is illustrated by the following examples which in no way present a limiting character.

EXAMPLES

Example 1 (According to the Invention)

A solid material of formula $(LiCl)_x.2Al(OH)_3,nH_2O$ is prepared, wherein n is between 0.01 and 1 and x=0.6, according to a synthetic method according to the invention, wherein the bringing into contact step b) is carried out with an Li/Al ratio of 0.5 and the shaping step is carried out by acid extrusion-kneading.

1/Precipitation of Boehmite AlOOH

In a beaker cooled by an ice bath, a solution containing 326 ml of deionized water and 135.6 g of aluminum chloride hexahydrate ($AlCl_3,6H_2O$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. This cake is suspended in a 3 L beaker with 320 mL of water.

A sample of the precipitate obtained is taken from the reaction medium. The XRD (FIG. 1) of the precipitate shows that the precipitate obtained in example 1 is in fact a boehmite precipitate. The boehmite precipitate obtained in Example 1 is poorly crystallized.

The crystallite size of the boehmite obtained is measured according to the Sherrer method:

Size according to [020]=0.6±0.1 (nm); Size according to [120]=1.4±0.1 (nm)

2/Addition of Lithium Chloride LiCl.

A solution containing 11.9 g of lithium chloride LiCl provided by Prolabo is prepared, wherein this corresponds to an Li/Al molar ratio of 0.5, and 1326 ml of water which is added to the plumped cake. This reaction medium is stirred and heated at 80° C. for 2 h.

Filtration and drying in an autoclave at 80° C. for 8 hours follow the first 2 steps.

The solid material thus prepared is characterized by the formula $(LiCl)_x.2Al(OH)_3,nH_2O$, wherein n=0.25 and x=0.6, according to a synthetic method according to the invention.

The shaping step is performed by kneading then extrusion. For the kneading step, 35.5 g of paste obtained above is introduced into a Brabender-type kneader (bowl volume 80 ml) with 1.88 g of oxalic acid solution at 100 g/l which corresponds to 1% by weight of oxalic acid relative to the dry matter, wherein the dry material is the weight of the paste resulting from the preceding drying, dried in an autoclave at 200° C. for 6 hours. A supplement of water of approximately 4.7 g is added in order to obtain a cohesive, homogeneous and extrudable paste. The kneading is continued at the same speed for 20 minutes after the end of the addition of acid and water.

The paste obtained is shaped using a piston extruder (from MTS) equipped with a cylindrical die 1 mm in diameter.

Figure 2:
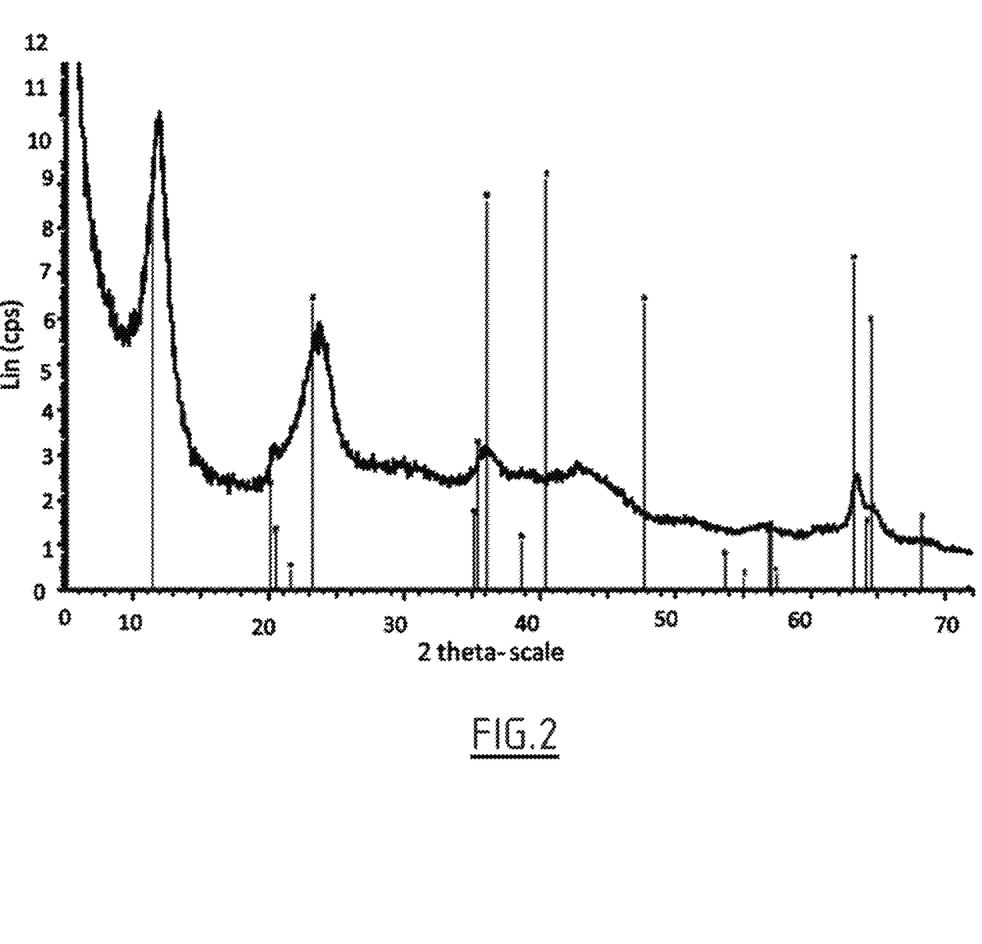
FIG. 2 shows the X-ray diffraction pattern of the final solid materials obtained in extruded form respectively in Examples 1 to 4.

Extrudates of the solid material having good cohesion and appearance are obtained. An $(LiCl)_x.2Al(OH)_3,nH_2O$ phase is detected on the X-ray diffraction pattern of the extrudates of the solid material of formula $(LiCl)_x.2Al(OH)_3,nH_2O$, wherein n=0.25, obtained in Example 1 (FIG. 2).

The extrudates obtained are also characterized by the following measures:

Elemental analysis shows a good Li/Al/Cl stoichiometry corresponding to the composition of an $(LiCl)_x.2Al(OH)_3,nH_2O$ structure.

Al=24.8% weight; Li=1.9% weight; Cl, =9.8% weight.

The extrudates obtained according to Example 1 have good visual cohesion, have no or few cracks and offer both very good cohesion and very good mechanical strength when they are in contact with a brine (percentage destruction less than 15% in the cohesion test) or water (percentage destruction less than 20% in the cohesion test).

Example 2 (According to the Invention)

A solid material of formula $(LiCl)_x.2Al(OH)_3,nH_2O$ is prepared, wherein n is between 0.01 and 1 and x=0.6, according to a synthetic method according to the invention, wherein the contacting step b) is carried out with an Li/Al ratio of 0.5 and the shaping step is carried out by acid extrusion-kneading.

1/Precipitation of Boehmite AlOOH

In a beaker cooled by an ice bath, a solution containing 326 ml of deionized water and 135.6 g of aluminum chloride hexahydrate ($AlCl_3, 6H_2O$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. This cake is suspended in a 3 L beaker with 320 mL of water.

A sample of the precipitate obtained is taken from the reaction medium. The XRD (FIG. 1) of the precipitate shows that the precipitate obtained in Example 1 is, in fact, a boehmite precipitate. The boehmite precipitate obtained in Example 1 is poorly crystallized. The size of the crystallites of the boehmite obtained is measured according to the Sherrer method:

Size according to [020]=0.6±0.1 (nm); Size according to [120]=1.4±0.1 (nm)

2/Addition of Lithium Chloride LiCl.

A solution containing 11.9 g of lithium chloride LiCl provided by Prolabo is prepared, wherein this corresponds to an Li/Al molar ratio of 0.5, and 1326 ml of water which is added to the plumped cake. This reaction medium is stirred and heated at 80° C. for 2 h.

Filtration and drying in an autoclave at 80° C. for 8 hours follow the first 2 steps.

The solid material thus prepared is characterized by the formula $(LiCl)_x \cdot 2Al(OH)_3, nH_2O$, wherein n=0.25 and x=0.6 according to a synthetic method according to the invention.

The shaping step is performed by kneading and then extrusion. For the kneading step, 35.5 g of paste obtained above is introduced into a Brabender-type kneader (bowl volume 80 ml) with 0.33 g of 85% phosphoric acid solution, which corresponds to 0.5% by weight of phosphoric acid relative to the dry matter, wherein the dry material is the weight of the paste resulting from the preceding drying, dried in an autoclave at 200° C. for 6 hours. An additional 8.2 g of water is added in order to obtain a cohesive, homogeneous and extrudable paste. The kneading is continued at the same speed for 20 minutes after the end of the addition of acid and water.

The paste obtained is shaped using a piston extruder (from MTS) equipped with a cylindrical die 1 mm in diameter.

Extrudates of solid material having good cohesion and appearance are obtained. An $(LiCl)_x \cdot 2Al(OH)_3, nH_2O$ phase is detected on the X-ray diffraction pattern of the extrudates of the solid material of formula $(LiCl)_x \cdot 2Al(OH)_3, nH_2O$, wherein n=0.25 obtained in Example 2 (FIG. 2).

The extrudates obtained are also characterized by the following measures:

Elemental analysis shows a good Li/Al/Cl stoichiometry corresponding to the composition of an $(LiCl)_x \cdot 2Al(OH)_3, nH_2O$ structure.

Al=24.8% weight; Li=1.9% weight; Cl, =9.8% weight.

The extrudates obtained according to Example 2 have good visual cohesion, have no or only few cracks and exhibit both very good cohesion and very good mechanical strength when they are in contact with a brine (percentage destruction less than 15% in the cohesion test) or water (percentage destruction less than 20% in the cohesion test).

Example 3 (Comparison with Basic Extrusion-Kneading)

A solid material of formula $(LiCl)_x \cdot 2Al(OH)_3, nH_2O$ is prepared, wherein n is between 0.01 and 1 and x=0.6, according to a synthetic method according to the invention, wherein the bringing into contact step b) is carried out with an Li/Al molar ratio of 0.5 and the shaping step is carried out by basic extrusion-kneading.

1/Precipitation of Boehmite AlOOH

In a beaker cooled by an ice bath, a solution containing 326 ml of deionized water and 135.6 g of aluminum chloride hexahydrate ($AlCl_3$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. The suspension obtained is filtered and then washed with water. The cake is suspended in a 3 L beaker with 320 mL of water.

A sample of the precipitate obtained is taken from the reaction medium. The XRD of the precipitate is identical to the XRD obtained in Example 1 (see FIG. 1) and shows that the precipitate obtained in Example 3 is In fact a boehmite precipitate. The boehmite precipitate obtained in Example 3 is poorly crystalline.

The size of the crystallites of the boehmite obtained is measured according to the Sherrer method:

Size according to [020]=0.6±0.1 (nm); Size according to [120]=1.4±0.1 (nm)

2/Addition of Lithium Chloride LiCl.

A solution containing 11.9 g of lithium chloride LiCl provided by Prolabo is prepared, wherein this corresponds to an Li/Al ratio of 0.5 and 1326 ml of water which is added to the plumped cake. This reaction medium is stirred and heated at 80° C. for 2 h.

Filtration and drying in an oven at 80° C. for 8 hours follow the first 2 steps.

3/Extrusion-Kneading

The shaping step is performed by kneading and then extrusion. For the kneading step, 35.5 g of the paste obtained above is introduced into a Brabender-type kneader (80 ml volume of the tank) with 1.39 g of ammonia solution at 20.18% by weight, which corresponds to 1% by weight of base ($NH_4OH$) relative to the dry material, wherein the dry material is the weight of the paste resulting from the preceding drying, dried in an autoclave at 200° C. for 6 hours. The ammonia solution is mixed with 16 g of demineralized water and is added in 2 minutes while kneading at 50 rpm. A supplement of water of about 2.7 g is added in order to obtain a cohesive, homogeneous and extrudable paste. The kneading is continued at the same speed for 30 minutes after the end of the addition of ammonia and water.

The paste obtained is shaped using a piston extruder (from MTS) equipped with a cylindrical die 1 mm in diameter.

The extrudates of the solid material obtained in Example 3 has good cohesion and a good appearance. According to the X-ray diffraction pattern, an $(LiCl)_x \cdot 2Al(OH)_3, nH_2O$ phase is detected.

The XRD of the final material is identical to the XRD of the material obtained in Example 1 (see FIG. 2).

The extrudates obtained are also characterized by the following measurements:

Elemental analysis shows a good Li/Al/Cl stoichiometry corresponding to the composition of an $(LiCl)_x \cdot 2Al(OH)_3, nH_2O$ structure Al=24.8% weight; Li=1.9% weight; Cl, =9.8% weight.

The extrudates obtained according to Example 3 offer good visual cohesion, have no or few cracks and have both very good cohesion and very good mechanical strength when they are in contact with a brine (percentage destruction less than 15% in the cohesion test) or water (percentage destruction less than 20% in the cohesion test).

Example 4 (According to the Invention)

A solid material of formula $(LiCl)_x \cdot 2Al(OH)_3 \cdot nH_2O$ is prepared, wherein n is between 0.01 and 1 and x=1, according to a synthesis method not according to the invention, wherein the bringing into contact step b) is carried out with an Li/Al ratio of 3.3. The shaping step is carried out by acid extrusion-kneading.

1/Precipitation of Boehmite AlOOH

In a beaker cooled by an ice bath, a solution containing 326 ml of deionized water and 135.6 g of aluminum chloride hexahydrate ($AlCl_3$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. The suspension obtained is filtered and then washed with water. The cake is suspended in a 3 L beaker with 320 mL of water.

Figure 1:
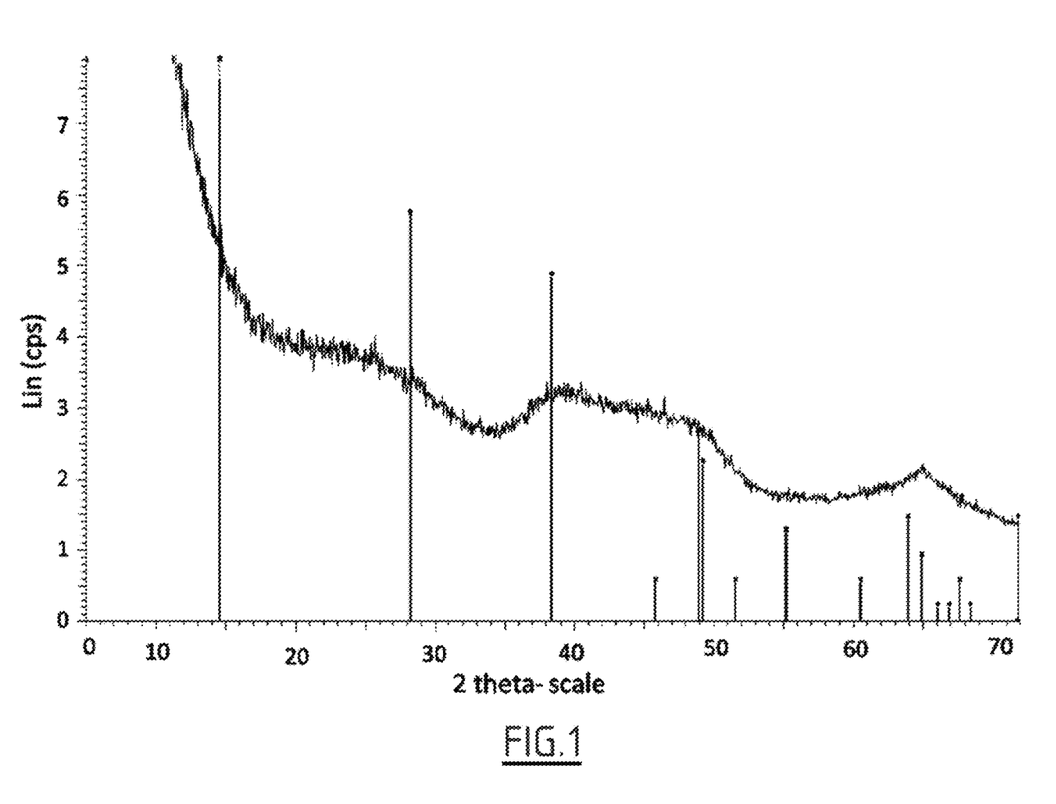
FIG. 1 shows the X-ray diffraction pattern of the precipitated boehmites obtained in Examples 1 to 4.

A sample of the precipitate obtained is taken from the reaction medium. The XRD of the precipitate shows that the precipitate obtained in Example 4 is in fact a boehmite precipitate (FIG. 1). The boehmite precipitate obtained in Example 4 is poorly crystallized.

The size of the crystallites of the boehmite obtained is measured according to the Sherrer method:

Size according to [020]=0.6±0.1 (nm); Size according to [120]=1.4±0.1 (nm)

2/Addition of Lithium Chloride LiCl.

A solution containing 78.5 g of lithium chloride LiCl supplied by Prolabo is prepared, wherein this corresponds to an Li/Al ratio of 3.3, and 1326 ml of water which is added to the plumped cake. This reaction medium is stirred and heated at 80° C. for 2 h. Filtration and drying in an autoclave at 80° C. for 8 hours follow the first 2 steps.

3/Extrusion-Kneading

The shaping step is performed by kneading and then extrusion. For the kneading step, 35.5 g of paste obtained above is introduced into a Brabender-type kneader (bowl volume 80 ml) with 1.88 g of oxalic acid solution at 100 g/l which corresponds to 1% by weight of oxalic acid relative to the dry material, wherein the dry material is the weight of the paste resulting from the preceding drying, dried in an autoclave at 200° C. for 6 hours. A supplement of water of approximately 4.7 g is added in order to obtain a cohesive, homogeneous and extrudable paste. The kneading is continued at the same speed for 20 minutes after the end of the addition of acid and water.

The paste obtained is shaped using a piston extruder (from MTS) equipped with a cylindrical die 1 mm in diameter.

Extrudates of the solid material of formula $(LiCl)_x \cdot 2Al(OH)_3 \cdot nH_2O$, wherein n=0.25 and x=1 offer good cohesion while a good appearance is obtained. An $(LiCl)_x \cdot 2Al(OH)_3 \cdot nH_2O$ phase is detected on the X-ray diffraction pattern of the extruded solid material of formula $(LiCl)_x \cdot 2Al(OH)_3 \cdot nH_2O$, wherein n=0.25 and x=1 obtained in Example 4. The DRX of the final material is identical to the XRD of the material obtained in Example 1 (see FIG. 2).

The extrudates obtained are also characterized by the following measurements:

Elemental analysis shows a good Li/Al/Cl stoichiometry corresponding to the composition of an $(LiCl)_x \cdot 2Al(OH)_3 \cdot nH_2O$ structure Al=23% weight; Li=3% weight; Cl, =15.1% weight.

The extrudates obtained according to Example 4 offer good visual cohesion, have no or only few cracks and offer both very good cohesion and very good mechanical strength when they are in contact with a brine (percentage destruction less than 15% in the cohesion test) or water (percentage destruction less than 20% in the cohesion test).

Example 5 (Comparison: Direct Extrusion without Acid Kneading)

A solid material of formula $(LiCl)_x \cdot 2Al(OH)_3 \cdot nH_2O$ is prepared, wherein n is between 0.01 and 1 and x=1 according to a synthesis method not according to the invention, wherein the shaping step is carried out by direct extrusion, without acid kneading.

1/Precipitation of Boehmite AlOOH

In a beaker cooled by an ice bath, a solution containing 326 ml of deionized water and 135.6 g of aluminum chloride hexahydrate (AlC13) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. This cake is suspended in a 3 L beaker with 320 mL of water.

A sample of the precipitate obtained is taken from the reaction medium. The XRD (FIG. 1) of the precipitate shows that the precipitate obtained in Example 5 is In fact a boehmite precipitate. The boehmite precipitate obtained in Example 5 is poorly crystallized. The size of the crystallites of the boehmite obtained is measured according to the Sherrer method:

Size according to [020]=2.1±2 (nm); Size according to [120]=2.8±3 (nm)

2/Addition of Lithium Chloride LiCl.

A solution containing 11.9 g of lithium chloride LiCl provided by Prolabo is prepared, wherein this corresponds to an Li/Al ratio of 0.5 and 1326 ml of water which is added to the plumped cake. This reaction medium is stirred and heated at 80° C. for 2 h.

Filtration and drying in an autoclave at 80° C. for 8 hours follow the first 2 steps.

The solid material thus prepared is characterized by the formula $(LiCl)_x \cdot 2Al(OH)_3 \cdot nH_2O$, wherein n=0.25 and x=1 according to a synthetic method according to the invention. The shaping step of the paste obtained is carried out directly after the drying step, without a prior kneading step and in the absence of binder. The paste obtained is shaped using a piston extruder (from MTS) equipped with a cylindrical die 1 mm in diameter.

Extrudates of the solid material of formula $(LiCl)_x \cdot 2Al(OH)_3 \cdot nH_2O$, wherein n=0.25 and x=0.6, offer good cohesion and good appearance. An $(LiCl)_x \cdot 2Al(OH)_3 \cdot nH_2O$ phase is detected on the X-ray diffraction pattern of the extruded solid material of formula $(LiCl)_x \cdot 2Al(OH)_3 \cdot nH_2O$, wherein n=0.25 and x=0.6 obtained in Example 5.

The XRD of the final material is shown in FIG. 2.

The extrudates obtained are also characterized by the following measurements:

Elemental analysis shows a good Li/Al/Cl stoichiometry corresponding to the composition of an $(LiCl)_x \cdot 2Al(OH)_3 \cdot nH_2O$ structure.

Al=24.8% weight; Li=1.9% weight; Cl, =9.8% weight.

The extrudates obtained according to Example 5 offer good visual cohesion, and have no or few cracks. However, when they are subjected to the strength test described above, they have less good cohesion and mechanical strength than the material obtained in Example 1 according to the invention when they are brought into contact with a brine (percentage destruction about 35% in the cohesion test) or water (percentage destruction about 45% in the cohesion test).

Example 6 Comparison (Boehmite Precipitation at pH=10, and Direct Extrusion without Acid Kneading)

A solid material of formula $(LiCl)_x.2Al(OH)_3,nH_2O$ is prepared, wherein n is between 0.01 and 1 and x=0.6 according to a synthesis method not according to the invention, wherein the Boehmite precipitation step is carried out at pH=10. The bringing into contact step b) is carried out with an Li/Al ratio=0.5.

1/Precipitation of Boehmite AlOOH

In a beaker cooled by an ice bath, a solution containing 326 ml of deionized water and 135.6 g of aluminum chloride hexahydrate ($AlCl_3$) is prepared. Then, with magnetic stirring, 67.5 g of sodium hydroxide (NaOH) are added for 30 minutes to adjust the pH. The pH reached at the end of the synthesis is 10. The temperature is maintained at 20° C. throughout the duration of the precipitation step. This cake is suspended in a 3 L beaker with 320 mL of water.

Figure 3:
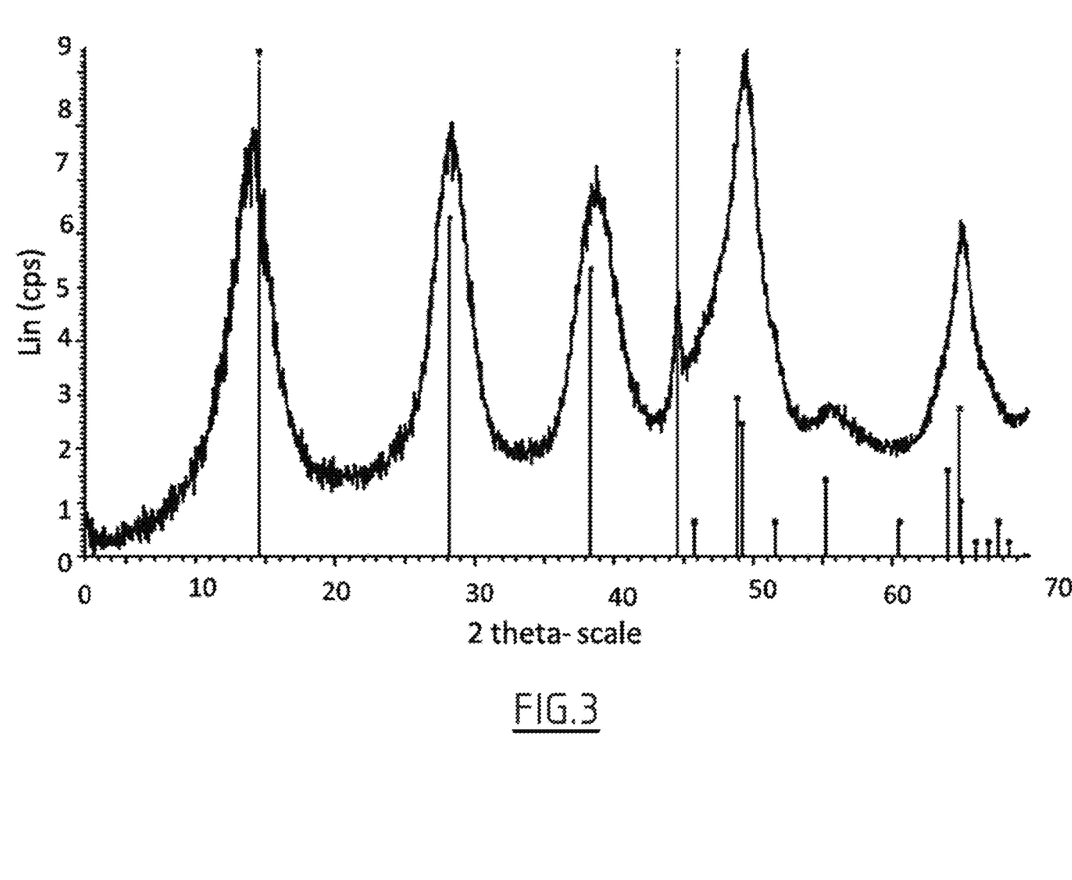
FIG. 3 shows the X-ray diffraction pattern of the precipitated boehmite obtained in Example 5.

A sample of the precipitate obtained is taken from the reaction medium. The XRD of the precipitate shows that the precipitate obtained in Example 6 is In fact a very well crystallized boehmite precipitate (see FIG. 3). The Size of the Crystallites of the Boehmite Obtained is measured according to the Sherrer method:

Size according to [020]=2.1±2 (nm); Size according to [120]=2.8±3 (nm)

2/Addition of Lithium Chloride LiCl.

A solution containing 11.9 g of lithium chloride LiCl provided by Prolabo is prepared, wherein this corresponds to an Li/Al ratio of 0.5, and 1326 ml of water which is added to the plumped cake. This reaction medium is stirred and heated at 80° C. for 2 h. Filtration and drying in an autoclave at 80° C. for 8 hours follow the first 2 steps.

The solid material thus prepared is characterized by the $(LiCl)_x.2Al(OH)_3,nH_2O$, wherein n=0.25 and x=0.6 according to a synthetic method according to the invention. The shaping step of the paste obtained is carried out directly after the drying step, without a prior kneading step and in the absence of binder. The paste obtained is shaped using a piston extruder (from MTS) equipped with a cylindrical die 1 mm in diameter.

Extrudates of the solid material of formula $(LiCl)_x.2Al(OH)_3,nH_2O$, wherein n=0.25 and x=0.6 offer good cohesion and good appearance. An $(LiCl)_x.2Al(OH)_3,nH_2O$ phase is detected on the X-ray diffraction pattern of the extruded solid material of $(LiCl)_x.2Al(OH)_3,nH_2O$, wherein n=0.25 and x=1 obtained in Example 6.

Figure 4:
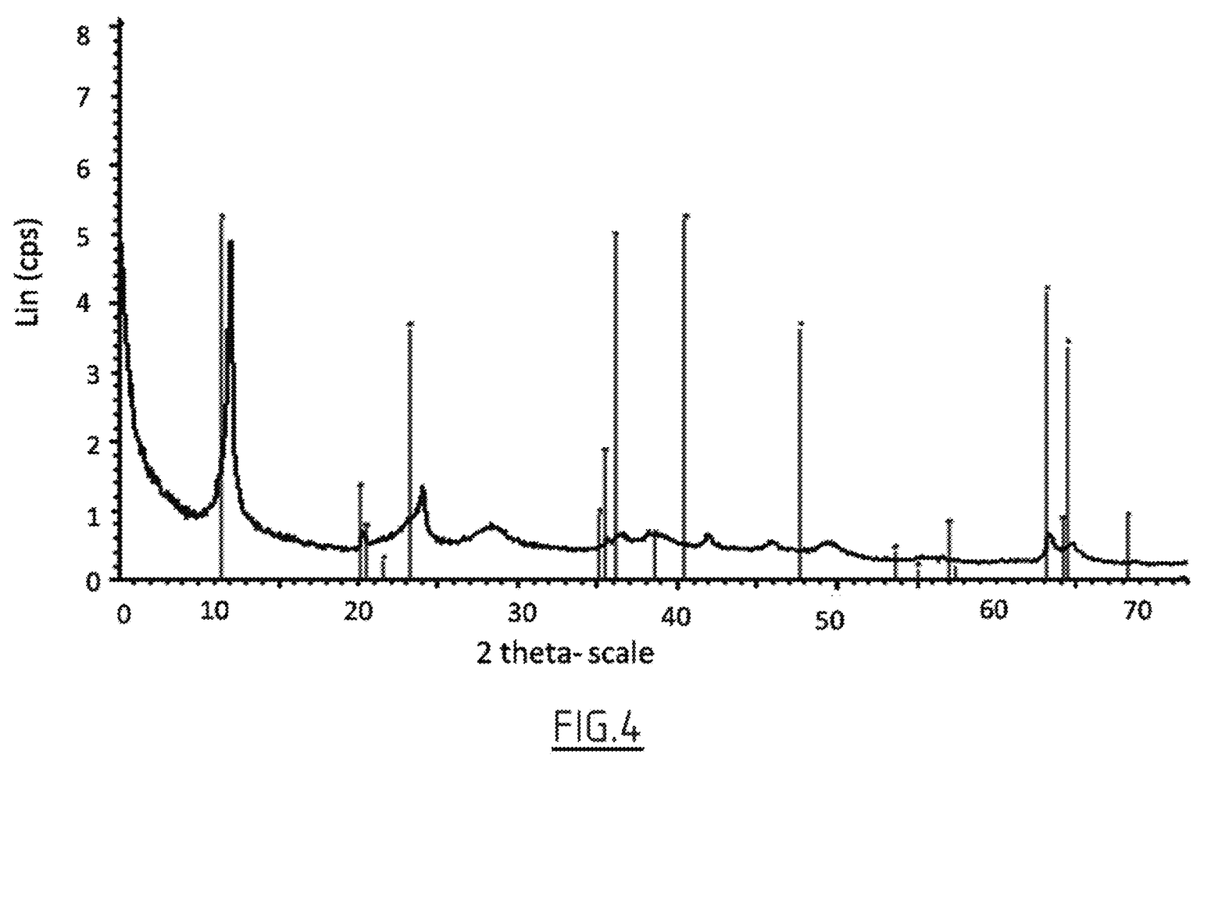
FIG. 4 shows the X-ray diffraction pattern of the final solid material obtained in the form of extrudates in Example 5.

The XRD of the final material is shown in FIG. 4.

The extrudates obtained are also characterized by the following measurements:

Elemental analysis shows a good Li/Al/Cl stoichiometry corresponding to the composition of a $(LiCl)_x.2Al(OH)_3,nH_2O$ structure:

Al=24.8% weight; Li=1.9% weight; Cl, =9.8% weight.

The extrudates obtained according to Example 6 visually exhibit good cohesion, have no or only few cracks and exhibit both very good cohesion and very good mechanical strength when they are brought into contact with a brine (percentage destruction less than 15% in the cohesion test) or water (percentage destruction less than 20% in the cohesion test).

Example 7: Comparison (Acid Extrusion-Kneading with a Solid Precursor Binder of Alumina A solid material of formula $(LiCl)_x.2Al(OH)_3,nH_2O$ is prepared, wherein n is between 0.01 and 1 and x=0.6, according to a synthetic method according to the invention in which the contacting step b) is carried out with an Li/Al ratio of 0.5 but the shaping step e) is carried out by acid extrusion-kneading in the presence of a solid precursor binder of alumina.

1/Precipitation of Boehmite AlOOH

In a beaker cooled by an ice bath, a solution containing 326 ml of deionized water and 135.6 g of aluminum chloride hexahydrate ($AlCl_3,6H_2O$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. The cake is suspended in a 3 L beaker with 320 mL of water.

A sample of the precipitate obtained is taken from the reaction medium. The precipitate obtained is a precipitate of boehmite. The boehmite precipitate obtained in Example 7 has small crystallites (also called "little crystallized" precipitate).

The size of the crystallites of the boehmite obtained is measured according to the Sherrer method:

Size according to [020]=0.6±0.1 (nm); Size according to [120]=1.4±0.1 (nm)

2/Addition of Lithium Chloride LiCl.

A solution containing 11.9 g of lithium chloride LiCl provided by Prolabo is prepared, this corresponds to an Li/Al molar ratio of 0.5, and 1326 ml of water which is added to the plumped cake. This reaction medium is stirred and heated at 80° C. for 2 h. Filtration and drying in an autoclave at 80° C. for 8 hours follow the first 2 steps.

The solid material thus prepared is characterized by the formula $(LiCl)_x.2Al(OH)_3,nH_2O$, wherein n=0.25 and x=0.6 according to a synthetic method according to the invention.

The shaping step is carried out by kneading (in the presence of a solid precursor of alumina, boehmite) and then extrusion. For the kneading step, 35.5 g of paste obtained above is introduced into a Brabender-type kneader (bowl volume 80 ml) with 6.9 g of phosphoric acid 85% by weight and 4.7 g of a Pural SB3 boehmite powder representing 25% weight of solid alumina precursor relative to the dry weight of paste, wherein the dry material is the weight of the paste resulting from the preceding drying, dried in an oven at 200° C. for 6 hours.

An additional amount of water of about 5.4 g is added in order to obtain a cohesive, homogeneous and extrudable paste. The kneading is continued at the same speed for 20 minutes after the end of the addition of boehmite, acid and water.

The paste obtained is shaped using a piston extruder (from MTS) equipped with a cylindrical die 1 mm in diameter.

Extrudates of the solid material having good cohesion and appearance are obtained. An $(LiCl)_x.2Al(OH)_3,nH_2O$ phase is detected on the X-ray diffraction pattern of the extrudates.

The extrudates obtained according to Example 7 visually exhibit good cohesion, have no or only few cracks and exhibit both very good cohesion and very good mechanical strength when they are brought into contact with a brine (percentage destruction less than 15% in the cohesion test) or water (percentage destruction less than 20% in the cohesion test).

Example 8: Comparison (Acid Extrusion-Kneading with Excess Acid)

A solid material of formula $(LiCl)_x \cdot 2Al(OH)_3 \cdot nH_2O$ is prepared, wherein n is between 0.01 and 1 and x=0.6, according to a synthetic method according to the invention, wherein the contacting step b) is carried out with an Li/Al ratio of 0.5, but the shaping step is carried out by acid extrusion-kneading with excess of acid.

1/Precipitation of Boehmite AlOOH

In a beaker cooled by an ice bath, a solution containing 326 ml of deionized water and 135.6 g of aluminum chloride hexahydrate ($AlCl_3, 6H_2O$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step.
The cake is suspended in a 3 L beaker with 320 mL of water. A sample of the precipitate obtained is taken from the reaction medium. The precipitate obtained is a precipitate of boehmite. The boehmite precipitate obtained in Example 8 has small crystallites (also called "little crystallized" precipitate). The size of the crystallites of the boehmite obtained is measured according to the Sherrer method:

Size according to [020]=0.6±0.1 (nm); Size according to [120]=1.4±0.1 (nm)

2/Addition of Lithium Chloride LiCl.

A solution containing 11.9 g of lithium chloride LiCl provided by Prolabo is prepared, this corresponds to an Li/Al molar ratio of 0.5, and 1326 ml of water which is added to the plumped cake. This reaction medium is stirred and heated at 80° C. for 2 h. Filtration and drying in an autoclave at 80° C. for 8 hours follow the first 2 steps.

The solid material thus prepared is characterized by the formula $(LiCl)_x \cdot 2Al(OH)_3 \cdot nH_2O$, wherein n=0.25 and x=0.6 according to a synthetic method according to the invention. The shaping step is performed by kneading and extrusion. For the kneading step, 35.5 g of paste obtained above is introduced into a Brabender-type kneader (bowl volume 80 ml) with 13.2 g of oxalic acid solution at 100 g/l which corresponds to 7% by weight of oxalic acid relative to the dry material, wherein the dry material is the weight of the paste resulting from the preceding drying, dried in an oven at 200° C. for 6 hours. The kneading is continued at the same speed for 20 minutes after the end of the addition of acid. The paste obtained is shaped using a piston extruder (from MTS) equipped with a cylindrical die 1 mm in diameter.

The extrudates of the solid material offer good cohesion and appearance. An $(LiCl)_x \cdot 2Al(OH)_3 \cdot nH_2O$ phase is detected on the X-ray diffraction pattern of the extruded solid material of formula $(LiCl)_x \cdot 2Al(OH)_3 \cdot nH_2O$.

The extrudates obtained according to Example 8 offer good visual cohesion, have no or only few cracks and exhibit both very good cohesion and very good mechanical strength when they are in contact with a brine (percentage destruction less than 15% in the cohesion test) or water (percentage destruction less than 20% in the cohesion test).

Example 9: Adsorption Capacity and Adsorption Kinetics Test

The kinetics of lithium adsorption by the extrudates and their adsorption capacity is tested by producing a drilling curve also called leakage curve or column saturation curve. A saturation curve is produced for each of the extrudates obtained in Examples 1 to 6:

15 g of solid are placed in a column 10 column volumes of 0.02 mol/L lithium chloride (LiCl) saline solution traverses the closed circuit column until a stable lithium solution concentration is reached a natural solution containing approximately 0.06 mol/L of lithium traverses the column by passing upwards, at a flow rate of 6 BV/h, i.e. six times the volume occupied by the extruded bed in one hour.

the lithium concentration is measured at the outlet of the column as a function of the volume of solution passed.

Figure 5:
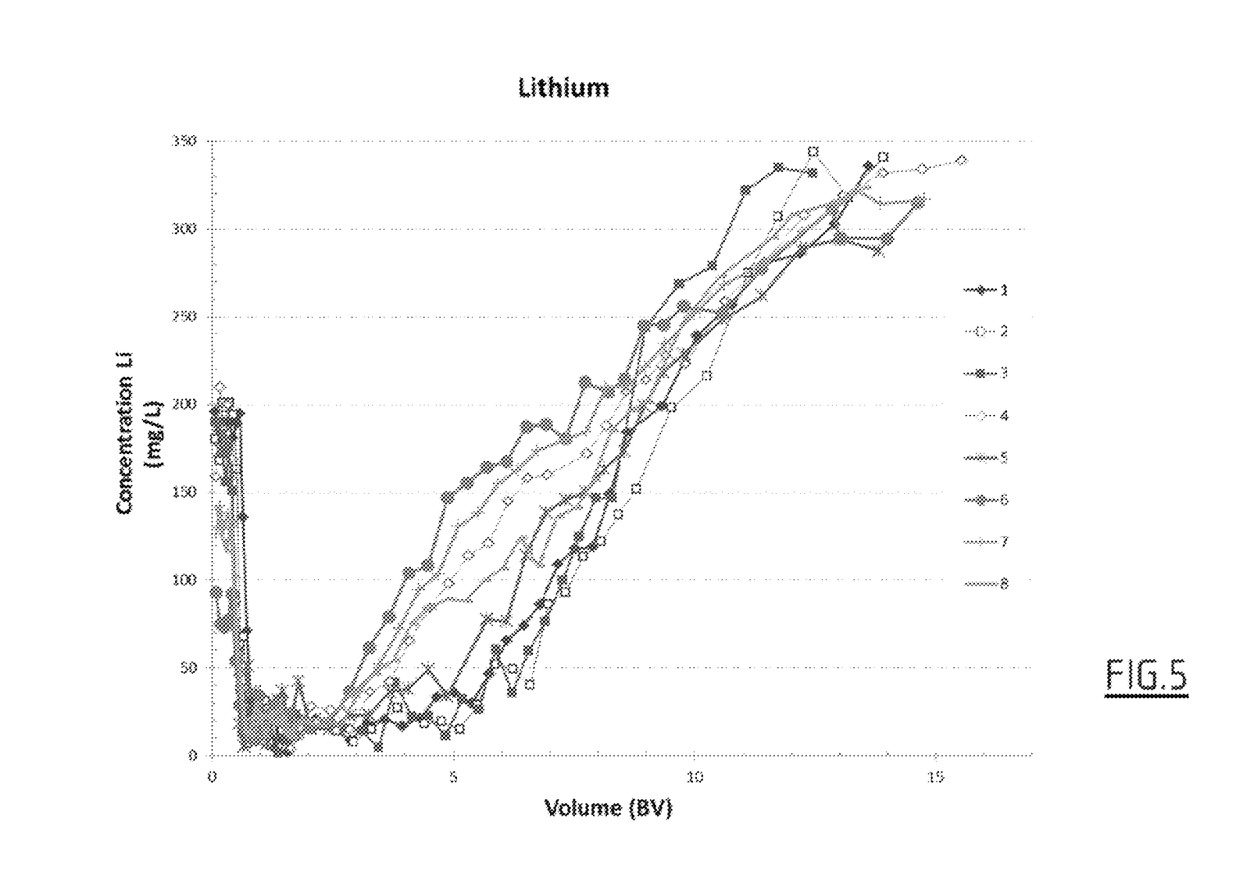
FIG. 5 shows the saturation curve according to Example 9, made from the extrudates obtained in Examples 1 to 8.

FIG. 5 shows the saturation curves obtained for each of the extrudates obtained in Examples 1, 2 and 4 in accordance with the invention and Examples 3, 5, 6, 7 and 8 not in accordance with the invention.

The results obtained are summarized in Table 1.

TABLE 1

| Examples | x | kneading | pH at end of precipitation | Li introduced (Li/Al) | Capacity mg(Li)/g (dry solid) | Ratio B/Li |
|---|---|---|---|---|---|---|
| 1 | 0.6 | Oxalic acid 1% | 8 | 0.5 | 6.8 | 0.09 |
| 2 | 0.6 | Phosphoric acid 0.5% | 8 | 0.5 | 6.8 | 0.09 |
| 3 | 0.6 | basic | 8 | 0.5 | 6.6 | 0.2 |
| 4 | 1 | Oxalic acid 1% | 8 | 3.3 | 6 | 0.09 |
| 5 | 1 | direct | 8 | 0.5 | 6.6 | 0.09 |
| 6 | 0.6 | direct | 10 | 0.5 | 4.3 | 0.4 |
| 7 | 0.6 | solid precursor binder of alumina | 8 | 0.5 | 5.0 | 0.12 |
| 8 | 0.6 | Oxalic acid 7% | 8 | 0.5 | 5.5 | 0.13 |

The extrudates obtained according to Examples 1, 2 and 4 according to the invention are compared with those obtained in Examples 3, 5, 6, 7 and 8 obtained according to preparation methods not in accordance with the invention. The extrudates of Examples 1 and 2 have a lithium adsorption capacity of 6.8 mg (Li)/g (dry solid). The extrusions of Examples 3 and 5 have a lithium adsorption capacity of 6.6 mg (Li)/g (dry solid). The extrudates of Example 4 have a lithium adsorption capacity of 6 mg (Li)/g (dry solid). However, the selectivities in B for Examples 1, 2 and 4 according to the invention are, in particular, better by a factor of 2 compared to Example 3 which does not conform to the invention. The B/Li ratio is 0.09 for Examples 1, 2 and 4 while it is 0.2 for Example 3 and 0.4 for Example 6.

The extrudates obtained in Example 7 according to a preparation method not according to the invention are compared with those of Example 2 according to the invention. The use of a solid precursor binder of alumina composed of a mixture of boehmite and phosphoric acid induces a loss of capacity of the extrudates which goes from 6.8 mg (Li)/g (dry solid) to 5, 0 mg (Li)/g (dry solid).

The extrudates obtained in Example 8 according to a preparation method not according to the invention are compared with those of Example 1 according to the invention. The use of an excess of oxalic acid, here 7%, induces a loss of capacity of the extrudates which goes from 6.8 mg (Li)/g (dry solid) to 5.5 mg (Li)/g (dry solid).

The invention claimed is:

1. A method for preparing a crystalline solid material of formula $(LiCl)_x \cdot 2Al(OH)_3 \cdot nH_2O$, wherein n is between 0.01 and 10, x is between 0.4 and 1, and wherein the method comprises:

a) precipitating boehmite, in an aqueous medium, comprising bringing into contact at least one basic precursor and at least one acidic precursor, wherein at least one of the basic or acidic precursors comprises aluminum, in order to obtain a boehmite suspension, wherein the precipitation is carried out at a temperature of between 5 and 35° C., and the amount of the basic precursor is selected in order to obtain a pH of the end of precipitation in a reaction medium of between 7.5 and 9.5, b) bringing into contact the precipitate obtained in a) with at least lithium chloride (LiCl) as lithium source to form a suspension, c) filtering the suspension obtained in b) to obtain a paste, d) drying the paste obtained at the end of c) at a temperature between 20 and 80° C., e) shaping the dried paste obtained in d) by acid extrusion-kneading, wherein the dried paste is kneaded in the presence of an amount of acid of between 0.05 and 5% by weight relative to dry material, wherein the dry material is the weight of the dried paste dried in an oven at 200° C., wherein the acid is an organic or inorganic acid, wherein the dried paste is then subjected to an extrusion, and the shaping the dried paste by acid extrusion-kneading is carried out in the absence of a binder, and f) drying the shaped dried paste obtained at the end of e) at a temperature between 20 and 200° C.

2. The method according to claim 1, wherein the basic precursor is sodium hydroxide (NaOH).

3. The method according to claim 1, wherein the amount of the basic precursor is selected in order to obtain an end of precipitation pH of a) in the reaction medium of between 7.7 and 8.8.

4. The method according to claim 1, wherein b) is carried out in the presence of a quantity of lithium chloride equivalent to a molar ratio of Li/Al between 0.3 and 4.

5. The method according to claim 1, wherein the organic acid used in e) is a carboxylic acid or derivative thereof selected from the group consisting of carboxylic acid salts, alkaline salts and earth salts, alkali metal salts, ammonium salts, and acid anhydrides, while the inorganic acid used in e) is selected from the group consisting of nitric acid, phosphoric acid, sulfuric acid, hydrochloric acid, and mixtures thereof.

6. The method according to claim 5 wherein the acid is an organic acid selected from the group consisting of oxalic acid, malonic acid, succinic acid, glutaric acid, adipic acid, and mixtures thereof.

7. The method according to claim 6, wherein e) is carried out in the presence of oxalic acid.

8. The method according to claim 7, wherein the dried paste is kneaded in the presence of an amount of acid between 0.1 and 2.5% by weight relative to the dry material, wherein the dry material is the weight of the dried paste from e), dried in an oven at 200° C.

9. The method according to claim 1, wherein the basic precursor is selected from the group consisting of sodium aluminate, potassium aluminate, ammonia, sodium hydroxide, and potassium hydroxide.

10. The method according to claim 1, wherein the acidic precursor is aluminum chloride or hydrochloric acid.

* * * * *